Patented July 4, 1933

1,916,872

UNITED STATES PATENT OFFICE

JOHN WACHMAN AND GEORGE B. SIPPEL, OF CINCINNATI, OHIO, ASSIGNORS, BY MESNE ASSIGNMENTS, TO STANDARD BRANDS INCORPORATED, OF NEW YORK, N. Y., A CORPORATION OF DELAWARE

STARCH CONVERSION PRODUCT AND PROCESS OF MAKING SAME

No Drawing. Application filed April 30, 1931. Serial No. 534,132.

This invention relates to novel starch conversion products and to processes of preparing the same, and has as a general object the production of products of novel and useful composition by improved processes which may be efficiently and economically carried out.

A particular object of the invention is to provide a readily soluble starch conversion product, having no marked flavor and but slight sweetening effect, which has nutritive value and is easily assimilated in the human system; in particular it may be added to milk and acts as an emulsant.

A more specific object of the invention is to provide a water-soluble product of the character described, which is comprised largely of amylo-dextrin and contains but a small amount of maltose, and which may be dried to form a non-hygroscopic product.

A further object of the invention is to provide a product which may be mixed with other food products to increase the body thereof without noticably affecting the flavor and which in certain products acts to retard or prevent the onset of crystallization.

Other objects of the invention will in part be obvious and will in part appear hereinafter.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

Considered generally, our novel starch conversion product may be prepared by first dextrinizing starch, such as, for example, white corn starch, by ordinary dry-treatment with a mineral acid such as, for example, hydrochloric acid, at a temperature of about 110–125° C., until the product gives a blue to blue-purple color reaction with iodine, and then diastatically converting this dextrinized product.

In a preferred form of the invention this diastatic conversion is continued until the product produced is composed largely of amylo-dextrin, contains substantially no higher dextrins, and no starch as shown by the fact that it gives a brown or light brown color reaction with iodine; contains but a small amount of maltose; and after filtration dissolves readily and completely in cold water. It is to be understood, however, that products of varying composition may be made in this way without departing from the spirit of the present invention.

As a more specific illustration of the manner in which our novel product may be prepared, but without limiting ourselves to the exact details thereof, the following example is given:

A suitable starch, such as, for example, white corn starch, is first treated with dilute hydrochloric acid in a known manner to dextrinize the starch until it gives a blue to blue-purple color reaction with iodine. To this dextrin is added enough hot water to make up a 10%–30% (preferably 20%) total solid content. The mixture is then heated, or cooled as the case may be, to about 75° C., the acidity is neutralized if necessary to a degree which will not harm the diastatic material to be added, and into it there is added sufficient amount of diastatic material to give a diastatic strength of from 0.5° to 1.0°, (preferably about 0.7°) Lintner. The diastatic material is preferably added in the form of a highly diastatic malt syrup (having a diastatic strength of at least 250° Lintner) in an amount of about 0.9%, by weight, of the dextrin used; although, if desired, ground diastatic malt or other suitable diastatic material, may be used. The use of diastatic malt extract is preferred over the use of ground diastatic malt.

The hydrogen-ion concentration of the mixture of dextrin and diastatic material is then finally adjusted to between about 4.7 and 5.3 (preferably 5.0) pH, whereupon the temperature of the mixture is adjusted to about 75° C., and held for 10 or 15 minutes, and is then heated up to about 100° C. and held for 10 or 15 minutes for the purpose of insuring the liquefaction of any unconverted starch which may be present in the dextrin, so that in the latter steps of the process, conversion thereof will more easily take place.

The solution is then cooled to about 70°-75° C., whereupon an additional quantity of diastatically active substance is added to give the entire mixture a diastatic strength of approximately 1.2° Lintner (the amount of 250° Lintner diastatic malt extract required being about 2.1% by weight on the dextrin). The solution is then allowed to stand at between 70°-75° C. until it gives a brown color reaction with iodine.

In a preferred form of the process the maltose content is then checked and, if necessary, the entire solution is allowed to stand further at this temperature until the maltose content is between about 24%-27%, calculated back to a concentrated syrup having a specific gravity of approximately 1.39 or a density of 75°-80° Balling.

The solution is then heated for a time and to a temperature sufficient to stop any further diastatic action (generally about 10 minutes being required), and is then filtered, preferably with the use of some filtering aid, such as Filter cel or the like.

The object of all of the above diastatic treatment is to convert the dextrin and any starch which may be present therein, into a soluble product composed for the most part of amylo-dextrin and maltose, with the former in predominating quantities.

The filtrate is then either concentrated in a vacuum, preferably at a temperature between 50°-75° C. to a specific gravity of about 1.39 or, preferably, after partial concentration, is either dried in a drum drier at about 50°-75° C. or by spray drying.

If a substantially colorless product is desired, the filtrate may be treated with a suitable decolorizing agent and refiltered before concentrating or drying.

When our novel process is carried out in the preferred manner described above, a solution of the product having a specific gravity of about 1.39 may be made to have approximately the following composition:

|  | Per cent |
|---|---|
| Water | 24 |
| Maltose | 20-35 |
| Amylo-dextrin | 56-41 |

As will be readily understood by one skilled in the art, the maltose content may be varied somewhat by an appropriate control of the temperature at different stages, and we have found that if the maltose content is held very low, the finished product on standing will tend to precipitate, and if it is held as low as, say, about 10%-15% on the above basis, the color reaction with iodine may be somewhat red, or even faintly purple. On the other hand, if the maltose content is unduly increased, the product takes on a noticeably sweet taste. In either case, the uses to which it may be put are consequently limited. As indicated, however, a maltose content of between 24% and about 27% is to be preferred.

It will thus be seen that by means of the present invention, there has been provided a process of producing a novel and technically important product, having highly desirable and useful properties which adapt it for use particularly for admixture with food substances.

As an example of important uses to which our novel product has been put, we might mention the admixture thereof in an amount of from about 5% to 60% with hydrolyzed yeast, fruit juices or gelatin prior to spray drying, with the result that the hydrolyzed yeast, fruit juices, etc., are non-hygroscopic and all are readily and completely soluble in warm or hot water. Such applications or use are more particularly covered by copending applications Serial Nos. 544,922, 544,923, and 544,924. The product also may be used for other purposes as indicated and, in fact, has of itself marked adhesive qualities.

Since certain changes may be made in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Particularly it is to be understood that in said claims, ingredients or compounds recited in the singular are intended to include compatible mixtures of such ingredients wherever the sense permits; and that when the words "concentrate," "concentrated" or "concentrating" are used hereinafter in the claims, they are intended to include concentration to either a syrupy, a pasty or a sensibly dry condition.

Having described our invention, what we claim as new and desire to secure by Letters Patent, is:

1. As a new article of manufacture, a substantially completely water-soluble starch conversion product, composed largely of amylo-dextrin, and containing a small amount of maltose.

2. As a new article of manufacture, a substantially completely water-soluble starch conversion product, composed largely of amylo-dextrin, and containing an amount of maltose approximating 24%-27% in a solution of about 1.39 specific gravity.

3. As a new article of manufacture, a starch conversion product, composed largely of amylo-dextrin, and containing a small amount of maltose, said product being completely soluble in water and having no particular flavor of its own.

4. A process of manufacturing a substantially completely water-soluble starch conversion product, which includes dextrinizing starch with a mineral acid until it gives a blue to blue-purple color reaction with iodine, and thereafter diastatically converting said dextrinized starch until it gives a brown color reaction with iodine.

5. A process of manufacturing a substantially completely water-soluble starch conversion product, which includes dextrinizing starch with a mineral acid until it gives a blue to blue-purple color reaction with iodine, and thereafter diastatically converting said dextrinized starch until it is composed largely of amylo-dextrin.

6. A process of manufacturing a substantially completely water-soluble starch conversion product, which includes dextrinizing starch with a mineral acid until it gives a blue to blue-purple color reaction with iodine, and thereafter diastatically converting said dextrinized starch until it is composed largely of amylo-dextrin and contains a small amount of maltose.

7. A process of manufacturing a substantially completely water-soluble starch conversion product, which includes dextrinizing starch with a mineral acid until it gives a blue to blue-purple color reaction with iodine, and thereafter diastatically converting said dextrinized starch until it is composed largely of amylo-dextrin and contains from about 24%–27% maltose on a basis of a syrup having a specific gravity of about 1.39.

8. A process of manufacturing a substantially completely water-soluble starch conversion product, which comprises dextrinizing corn starch with a mineral acid until it gives a blue to blue-purple color reaction with iodine, treating said dextrinized product with diastase to render soluble any starch present, then further diastatically converting it until it is composed largely of amylo-dextrin and contains a small amount of maltose.

9. A process of manufacturing a substantially completely water-soluble starch conversion product, which comprises dextrinizing corn starch with a mineral acid until it gives a blue to blue-purple color reaction with iodine, treating said dextrinized product with diastase to render soluble any starch present, then further diastatically converting it until it is composed largely of amylo-dextrin and contains a small amount of maltose, and thereafter filtering and concentrating the filtrate.

10. A process of manufacturing a substantially completely water-soluble starch conversion product, which comprises dextrinizing starch with a mineral acid until it gives a blue to blue-purple color reaction with iodine, treating said dextrinized product with diastase to render soluble any starch present, then further diastatically converting it until it is composed largely of amylo-dextrin and contains a small amount of maltose, and thereafter filtering, decolorizing the filtrate, refiltering and concentrating the second filtrate.

11. A process of manufacturing a substantially completely water-soluble starch conversion product, which comprises dextrinizing starch with hydrochloric acid until it gives a blue to blue-purple color reaction with iodine, making said dextrinized product up with hot water to a concentration of from 10% to 30%, cooling to about 75° C. adding sufficient diastatic material to give a diastatic strength of from 0.5° to 1.0° Lintner, adjusting the hydrogen-ion concentration to between about 4.7 and 5.3 pH, holding the mixture at about 75° C. for from 10 to 15 minutes, heating up to about 100° C. for from 10 to 15 minutes, cooling to 70° to 75° C., adding additional diastatic material to bring the diastatic strength to approximately 1.2° Lintner, and allowing the mixture to stand at between 70° to 75° C. until it gives a brown color reaction with iodine.

12. A process of manufacturing a substantially completely water-soluble starch conversion product, which comprises dextrinizing starch with hydrochloric acid until it gives a blue to blue-purple color reaction with iodine, making said dextrinized product up with hot water to a concentration of from 10% to 30%, cooling to about 75° C., adding sufficient diastatic material to give a diastatic strength of from 0.5° to 1.0° Lintner, adjusting the hydrogen-ion concentration to between about 4.7 and 5.2 pH, holding the mixture at about 75° C. for from 10 to 15 minutes, heating up to about 100° C. for from 10 to 15 minutes, cooling to 70° to 75° C., adding additional diastatic material to bring the diastatic strength to approximately 1.2° Lintner, allowing the mixture to stand at between 70° to 75° C. until it gives a brown color reaction with iodine, and thereafter filtering and concentrating the filtrate.

13. A process of manufacturing a substantially completely water-soluble starch conversion product, which comprises dextrinizing white corn starch with hydrochloric acid until it gives a blue to blue-purple color reaction with iodine, making said dextrinized product up with hot water to a concentration of from 10% to 30%, cooling to about 75° C., adding sufficient diastatic material to give a diastatic strength of from 0.5° to 1.0° Lintner, adjusting the hydrogen-ion concentration to between about 4.7 and 5.2 pH, holding the mixture at about 75° C. for from 10 to 15 minutes, heating up to about 100° C., for from 10 to 15 minutes, cooling to 70° to 75° C., adding additional diastatic material to bring the diastatic strength to approximately 1.2° Lintner, allowing the mixture to stand at betwen 70° to 75° C., until it gives a brown color reaction with iodine, and thereafter filtering, decolorizing the filtrate, refiltering and concentrating the second filtrate.

14. A process of manufacturing a substantially completely water-soluble starch conversion product, which comprises dextrinizing white corn starch with hydrochloric acid until it gives a blue to blue-purple color reaction with iodine, making said dextrinized product up with hot water to a concentration of from 10% to 30%, cooling to about 75° C., adding sufficient diastatic material to give a diastatic strength of from 0.5° to 1.0° Lintner, adjusting the hydrogen-ion concentration to between about 4.7 and 5.2 pH, holding the mixture at about 75° C. for from 10 to 15 minutes, heating up to about 100° C. for from 10 to 15 minutes, cooling to 70° to 75° C., adding additional diastatic material to bring the diastatic strength to approximately 1.2° Lintner, allowing the mixture to stand at betwen 70° to 75° C. until it gives a brown color reaction with iodine and has a maltose content of between 24% to 27%, calculated back to a concentrated syrup having a specific gravity of approximately 1.39, and thereafter filtering, decolorizing the filtrate, refiltering and concentrating the second filtrate.

In testimony whereof we affix our signatures.

JOHN WACHMAN.
GEORGE B. SIPPEL.